(12) United States Patent
Sekiguchi

(10) Patent No.: US 7,030,775 B2
(45) Date of Patent: Apr. 18, 2006

(54) VEHICLE SURROUNDINGS MONITORING APPARATUS AND TRAVELING CONTROL SYSTEM INCORPORATING THE APPARATUS

(75) Inventor: Hiroyuki Sekiguchi, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 62 days.

(21) Appl. No.: 10/664,999

(22) Filed: Sep. 18, 2003

(65) Prior Publication Data
US 2004/0066285 A1 Apr. 8, 2004

(30) Foreign Application Priority Data
Sep. 24, 2002 (JP) ..................... 2002-278129

(51) Int. Cl.
*G08G 1/16* (2006.01)

(52) U.S. Cl. ............... 340/903; 340/435; 340/436; 701/301; 701/96

(58) Field of Classification Search ........... 340/903, 340/904, 435, 436; 701/301, 96; 180/274; 342/52, 53, 55, 70, 71, 72
See application file for complete search history.

(56) References Cited

U.S. PATENT DOCUMENTS

| | | | |
|---|---|---|---|
| 6,191,704 B1 | 2/2001 | Takenaga et al. | |
| 6,353,785 B1 * | 3/2002 | Shuman et al. | 701/48 |
| 6,721,659 B1 * | 4/2004 | Stopczynski | 701/301 |
| 2002/0049539 A1 * | 4/2002 | Russell et al. | 701/301 |
| 2003/0102997 A1 * | 6/2003 | Levin et al. | 342/57 |
| 2003/0201929 A1 * | 10/2003 | Lutter et al. | 342/52 |
| 2004/0167717 A1 * | 8/2004 | Buchanan et al. | 701/301 |

FOREIGN PATENT DOCUMENTS

| | | |
|---|---|---|
| DE | 196 29 775 A1 | 5/1997 |
| EP | 0 697 641 A2 | 2/1996 |
| EP | 0 890 470 A2 | 1/1999 |
| EP | 1 065 520 A2 | 1/2001 |
| JP | 06-230115 | 8/1994 |

OTHER PUBLICATIONS

Patent Abstracts of Japan for JP06–230115 published on Aug. 19, 1994.

* cited by examiner

*Primary Examiner*—Jeffery Hofsass
*Assistant Examiner*—Jennifer Stone
(74) *Attorney, Agent, or Firm*—Darby & Darby

(57) ABSTRACT

A vehicle surroundings monitoring apparatus comprises image solid object detecting means for detecting image solid objects based on image information outputted from a CCD camera, millimeter wave solid object detecting means for detecting millimeter wave solid objects based on signals outputted from a millimeter wave radar, fusion solid object establishing means for establishing fusion solid objects composed of single image solid objects, single millimeter wave solid objects and a combination of the image solid objects and the millimeter wave solid objects by fusing the image solid objects and the millimeter wave solid objects, first reliability judging means for judging a degree of reliability of the fusion solid objects based on a detecting situation of the respective fusion solid objects by the image solid object detecting means, second reliability judging means for judging a degree of reliability of the fusion solid objects based on a detecting situation of the respective fusion solid objects by the millimeter wave solid object detecting means and preceding vehicle selecting means for selecting a preceding vehicle from the fusion solid objects when it is judged that the fusion solid objects have a specified level of reliability according to either of the first reliability judging means and the second reliability judging means.

11 Claims, 4 Drawing Sheets

VEHICLE SURROUNDINGS MONITORING APPARATUS AND TRAVELING CONTROL SYSTEM INCORPORATING THE APPARATUS

BACKGROUND OF THE INVENTION

1. Field of the Invention

The present invention relates to a vehicle surroundings monitoring apparatus employing together a monitoring technique on the base of images and a monitoring technique using radar data and a traveling control system incorporating the apparatus.

2. Discussion of Related Arts

In recent years, such vehicle surroundings monitoring apparatuses as detecting traveling circumstances in front of an own vehicle by means of processing images taken by a camera mounted on a vehicle and the like and detecting information about a preceding vehicle traveling ahead of the own vehicle from the traveling circumstances, have been proposed. Further, various traveling control systems in which a follow-up control to the preceding vehicle or an intervehicle distance control between the own vehicle and the preceding vehicle are performed using such vehicle surroundings monitoring apparatuses, have been put into practical use.

In these vehicle surroundings monitoring apparatuses sometimes the ability of recognizing the preceding vehicle and the like is exacerbated due to adverse conditions such as rain, snow, fog, backlight, knighting driving and the like. Japanese Patent Application Laid-open No. Toku-Kai-Hei 6-230115 discloses a technology in which the intervehicle distance between an own vehicle and a preceding vehicle is obtained in two ways, one is processing images taken by a stereoscopic camera and the other is directly detecting the distance by a millimeter wave radar. The reliability of the intervehicle distances obtained in the respective ways is investigated based on exterior circumstances and the like and either of the intervehicle distances is selected based on the reliability.

However, the technology disclosed in Toku-Kai-Hei 6-230115 has a disadvantage that since the respective reliabilities of stereoscopic camera and millimeter wave radar are judged simply on the basis of the external circumstances, a proper intervehicle distance is rejected and wrong data are adopted in some cases.

Further, in the prior art, since only one of the two ways is adopted and the other is discarded as invalid, distance data of the vehicle surroundings monitoring apparatus are not efficiently used.

SUMMARY OF THE INVENTION

It is an object of the present invention to provide a vehicle surroundings monitoring apparatus capable of monitoring exterior circumstances of a vehicle with high precision by efficiently utilizing both exterior information based on picture images and exterior information obtained from a radar and to provided a traveling control system incorporating such an apparatus.

A vehicle surroundings monitoring apparatus for monitoring exterior circumstances and detecting a preceding vehicle traveling ahead of an own vehicle, comprises image solid object detecting means for detecting image solid objects based on image information outputted from a CCD camera, millimeter wave solid object detecting means for detecting millimeter wave solid objects based on signals outputted from a millimeter wave radar, fusion solid object establishing means for establishing fusion solid objects composed of single image solid objects, single millimeter wave solid objects and a combination of the image solid objects and the millimeter wave solid objects by fusing the image solid objects and the millimeter wave solid objects, first reliability judging means for judging a degree of reliability of the fusion solid objects based on a detecting situation of the respective fusion solid objects by the image solid object detecting means, second reliability judging means for judging a degree of reliability of the fusion solid objects based on a detecting situation of the respective fusion solid objects by the millimeter wave solid object detecting means and preceding vehicle selecting means for selecting a preceding vehicle traveling ahead of the own vehicle from the fusion solid objects when it is judged that the fusion solid objects have a specified level of reliability according to either of the first reliability judging means and the second reliability judging means.

DETAILED DESCRIPTION OF THE PREFERRED EMBODIMENTS

Figure 1:
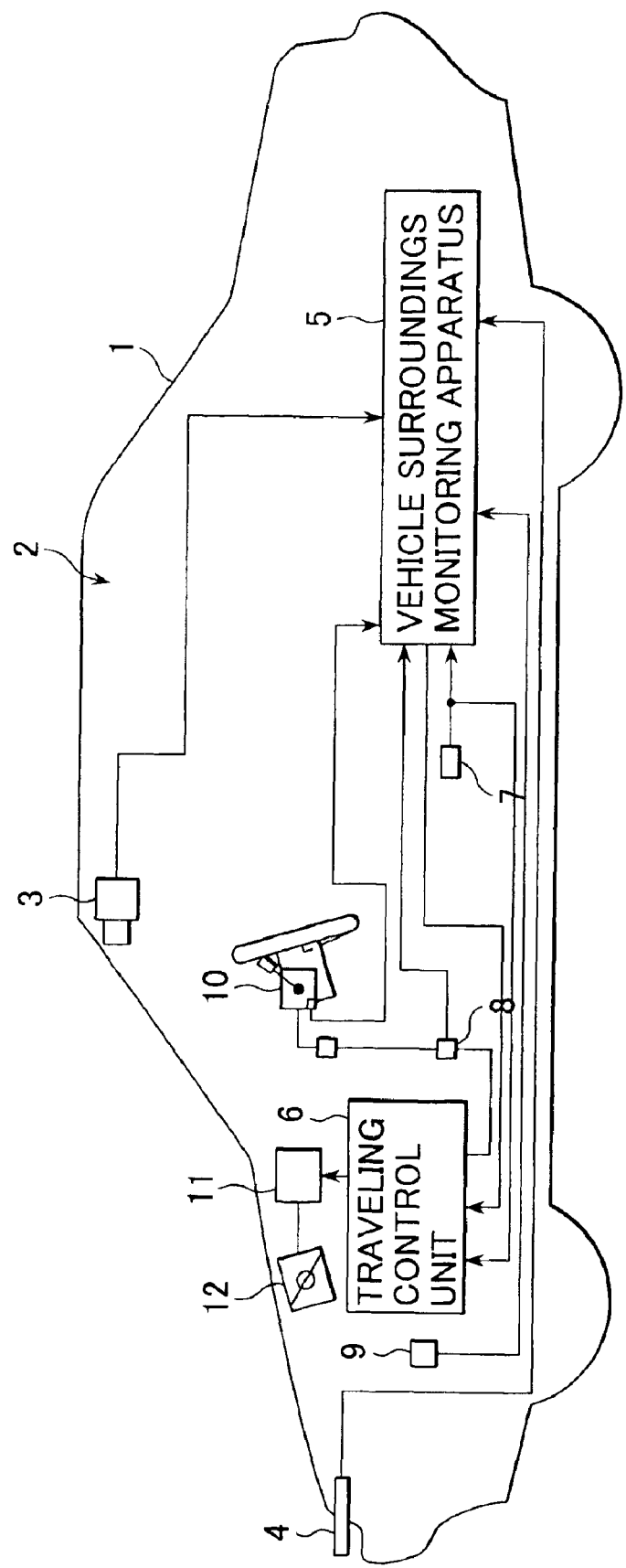
FIG. 1 is a schematic view showing a vehicle surroundings monitoring apparatus according to the present invention and a traveling control system incorporating the vehicle surroundings monitoring apparatus.
Figure 2:
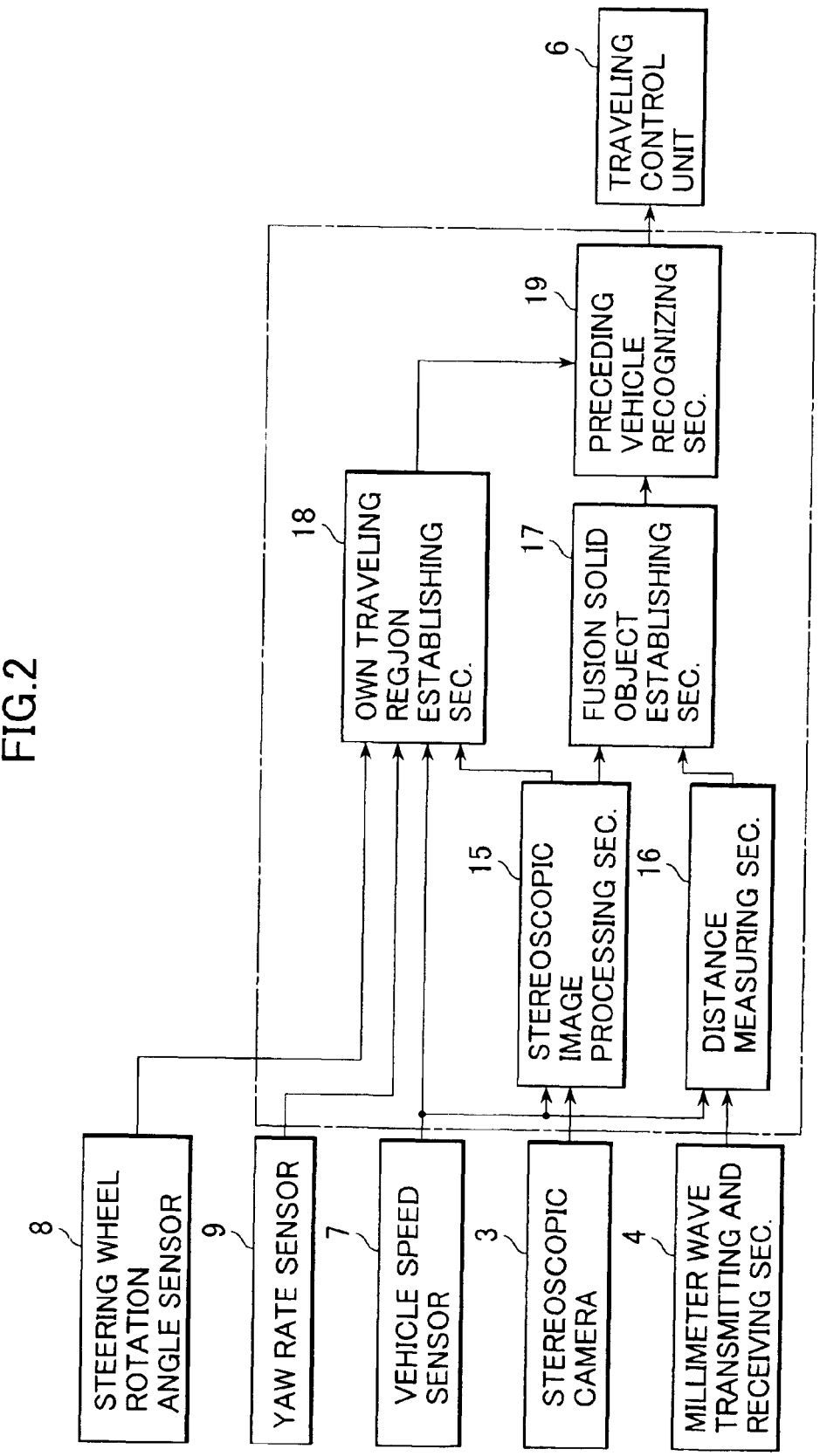
FIG. 2 is a functional block diagram of a vehicle surroundings monitoring apparatus according to the present invention.

Referring now to FIG. 1, reference numeral 1 denotes a vehicle (own vehicle) on which an intervehicle distance automatically adjusting system (Adaptive Cruise Control: ACC) 2 is mounted. The ACC system 2 is constituted by a stereoscopic camera (imaging means) 3, a millimeter wave transmitting and receiving section (radar means) 4, a vehicle surroundings monitoring apparatus 5 and a traveling control unit 6. When the ACC system is set to a constant speed control mode, the vehicle travels at a speed established by a vehicle driver and when the system is set to a follow-up traveling control mode, the vehicle travels at a speed targeted to the speed of a preceding vehicle with a constant intervehicle distance to the preceding vehicle maintained.

The stereoscopic camera 3 is composed of a pair (left and right) of CCD cameras using a solid-state image component such as Charge Coupled Device and the left and right cameras are transversely mounted on a front ceiling of a passenger compartment at a specified interval of distance, respectively. The respective cameras take picture images of an exterior object from different viewpoints and input image information to the vehicle surroundings monitoring apparatus 5.

The millimeter wave transmitting and receiving section 4 provided at the front end of the own vehicle 1 transmits millimeter wave (for example radio wave having frequency 30 G Hz to 100 G Hz) forwardly therefrom and receives reflected millimeter wave, inputting sending and receiving data to the vehicle surroundings monitoring apparatus 5.

Further, there is provided a vehicle speed sensor 7 in the own vehicle 1 and the detected vehicle speed is inputted to the vehicle surroundings monitoring apparatus 5 and the traveling control unit 6. Further, there are provided a steering wheel rotation angle sensor 8 for detecting steering wheel rotation angles and a yaw rate sensor 9 for detecting yaw rates. Signals indicating steering wheel rotation angles and yaw rates are inputted to the vehicle surroundings monitoring apparatus 5.

The vehicle surroundings monitoring apparatus 5 comprises a stereoscopic image processing section 15 (first solid object detecting means), a distance measuring section 16 (second solid object detecting means), a fusion solid object establishing section 17 (fusion solid object establishing means) an own traveling region estimating section 18 and a preceding vehicle recognizing section 19 (first and second reliability judging means and preceding vehicle selecting means). In this embodiment, those sections work in a coordinate system fixed to the own vehicle 1 of the three-dimensional real space. That is, the coordinate system is composed of X coordinate extending in a widthwise direction of the own vehicle 1, Y coordinate extending in a vertical direction of the own vehicle 1, Z coordinate extending in a lengthwise direction of the own vehicle 1 and an origin of the coordinate placed on the road surface directly underneath the central point of two CCD cameras forming the stereoscopic camera 3. The positive sides of X, Y and Z coordinates are established in a right direction, in an upward direction and in a forward direction, respectively.

The stereoscopic image processing section 15 performs various recognitions of lane markers, side walls, solid objects and the like as follows. First, with respect to a pair of stereoscopic images taken by the stereoscopic CCD camera 4, the stereoscopic image processing section 15 obtains distance information over the entire image from the deviation amount between corresponding positions according to the principle of triangulation and forms a distance image representing three-dimensional distance distribution based on the distance information. Then, based on the distance image, the stereoscopic image processing section 15 extracts lane markers, guardrails, curbs, side walls and solid objects like vehicles by performing the known grouping process, the comparison of the distance image with three-dimensional road profile data, side wall data such as guardrails, curbs and side walls along a road and solid object data such as vehicles and other data which are stored in the memory. Thus extracted lane marker data, side wall data and solid object data are denoted by different numbers for each kind of data, respectively. Further, the solid object data are classified into three kinds of objects, a backward moving object moving toward the own vehicle 1, a still object in standstill and a forward moving object moving in the same direction as the own vehicle 1 based on the relationship between the relative variation of the distance from the own vehicle and the vehicle speed of the own vehicle 1.

When an oncoming vehicle or a preceding vehicle is imaged, generally, its front surface, rear surface, corner part and side surface of a vehicle body are projected on picture images. The stereoscopic image processing section 15 usually extracts the front or rear surface as a solid object and extracts the side surface as a side wall connected through the corner part with the solid object. Accordingly, in case where the extracted solid object is a vehicle, mostly, a sidewall connected through a corner part with the solid object is recognized. In case where smear or flare are recognized as a solid object by accident, there is a very small chance that a side wall comes adjacent to the solid object. Accordingly, there is a high possibility that the solid object having two or more surfaces is a vehicle. In the stereoscopic image processing section 3, if the solid object is connected to the side wall through the corner part, the object is registered specially as a corner-like solid object.

The distance measuring section 16 performs solidity recognition by processing transmitting and receiving data inputted from the millimeter wave transmitting and receiving section 4 as follows. That is, the distance measuring section 16 measures the distance from the own vehicle 1 to the target based on a time between the transmission of a radio wave and the reception of the reflected radio wave. Then, preparing a distribution diagram of distance values, if there is a portion continuously having an identical distance value in the distribution diagram, the portion is extracted and registered as a solid object.

The distance measuring section 16 stores the data of the solid object extracted and registered in the previous cycle (this solid object will be referred to as "millimeter wave solid object" hereinafter). When the distance measuring section 16 extracts a new solid object in the present cycle (this solid object will be referred to as "detected millimeter wave solid object" hereinafter), the coincidence is judged between the detected millimeter wave solid object and the millimeter wave solid object. That is, in the distance measuring section 16, a coincidence probability P is calculated between the detected millimeter wave solid object and the millimeter wave solid object. If the coincidence probability P exceeds a threshold value, it is judged that the detected millimeter wave solid object is identical to the millimeter wave solid object. In this embodiment, the coincidence probability P is obtained according to the following formulas:

$$Pz(\Delta Z) = \int_{-\Delta Z}^{\Delta Z} 1/(\sqrt{2\pi}\,\sigma z) \times \exp[(-Z^2/(2\sigma z^2)] dz \quad (1)$$

$$Px(\Delta X) = \int_{-\Delta X}^{\Delta X} 1/(\sqrt{2\pi}\,\sigma x) \times \exp[(-X^2/(2\sigma x^2)] dx \quad (2)$$

$$Pv(\Delta V) = \int_{-\Delta V}^{\Delta V} 1/(\sqrt{2\pi}\,\sigma v) \times \exp[(-V^2/(2\sigma v^2)] dv \quad (3)$$

$$P = Pz \times Px \times Pv \quad (4)$$

where $Pz(\Delta Z)$ is a coincidence probability when the difference between the detected millimeter wave solid object n and the millimeter wave solid object on Z coordinate is $\Delta Z$; where $Px(\Delta X)$ is a coincidence probability when the difference between the detected millimeter wave solid object n and the millimeter wave solid object m on X coordinate is $\Delta X$; where $Pv(\Delta V)$ is a coincidence probability when the difference of the velocity in the Z direction between the detected millimeter wave solid object n and the millimeter wave solid object m is $\Delta V$; and $\sigma z$, $\sigma x$, $\sigma v$ are standard deviations.

In the distance measuring section 16, these calculations are performed with respect to all combinations of the detected millimeter wave solid object and the millimeter wave solid object and the combination whose coincidence probability P exceeds the threshold value (for example 30%) and is largest, is selected. Further, when it is judged that the detected millimeter wave solid object (present one) is identical to the millimeter wave solid object (previous one), the detected millimeter wave solid object is updated and successively registered as the millimeter wave solid object (previous one). If it is judged that the detected millimeter wave solid object is not identical to the millimeter wave solid object, the detected millimeter wave solid object is registered as a new millimeter wave solid object and the data of the previous one is erased under specified conditions.

The fusion solid object establishing section 17 inputs information related to respective solid objects (hereinafter, referred to as "image solid object") from the stereoscopic image processing section 15 and also inputs information related to respective millimeter wave solid objects from the distance measuring section 16. Fusion solid objects are established by fusing these inputted information.

Specifically, first, the fusion solid object establishing section 17 judges the coincidence between the respective image solid objects and the respective millimeter wave solid objects. That is, in the fusion solid object establishing section 17, the coincidence probability P is calculated for respective combinations of both solid objects according to the aforesaid formulas (1) to (4) using Z coordinate, X coordinate and the velocity in the Z direction of the respective image solid objects and Z coordinate, X coordinate and the velocity in the Z direction of the respective millimeter wave solid objects. When the image solid object is identical to the millimeter wave solid object, the combination whose coincidence probability P is largest and exceeds a specified value, is determined.

Figure 3:
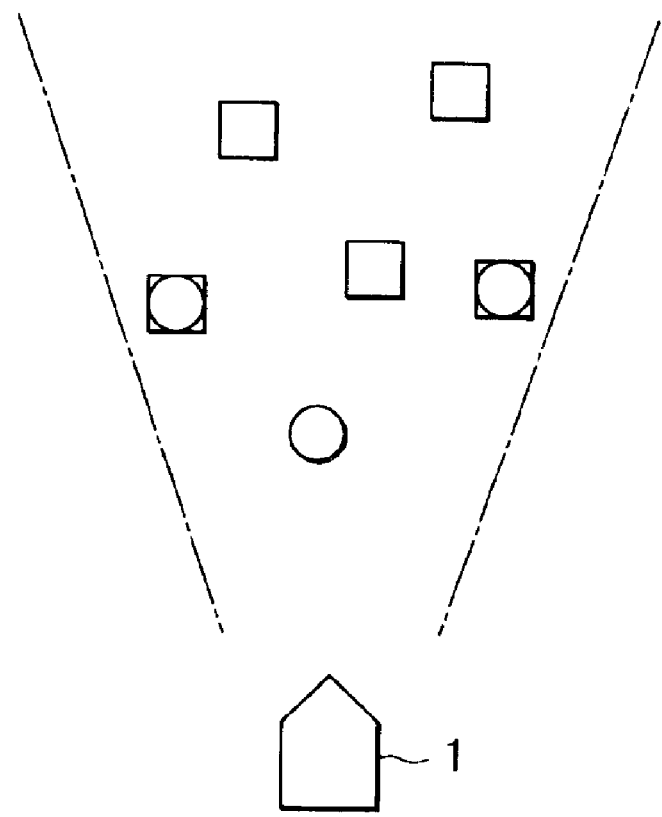
FIG. 3 is a schematic illustration of fusion solid objects.

Then, the fusion solid object establishing section 17 forms respective fusion solid objects by fusing the image solid objects and the millimeter wave solid objects. Referring to FIG. 3, fusion solid objects composed of simple image solid objects are illustrated in rectangular shape, fusion solid objects composed of simple millimeter wave solid objects are illustrated in circular shape, and fusion solid objects composed of the combination of the image solid objects and the millimeter wave solid objects are illustrated in rectangular and circular shape. The respective fusion solid objects include information such as the distance between the fusion solid object and the own vehicle 1, X coordinate, velocity, width and the like of the fusion solid object, and information of the state of movement of forward moving objects, still objects or oncoming vehicles. In case of the fusion solid object composed of the combination of the image solid object and the millimeter wave solid object, information of the millimeter wave solid object is introduced with top priority in establishing the distance between the own vehicle 1 and the solid object, information of the image solid object is introduced with top priority in establishing X coordinate, information of the millimeter wave solid object is introduced with top priority in establishing velocity, and information of the image solid object is introduced with top priority in establishing the width.

Then, after the new fusion solid objects are established, the fusion solid object establishing section 17 makes a coincidence judgment between the newly established fusion solid object and the fusion solid object previously registered. In case of the fusion solid object having coincidence, the fusion solid object is continued to be registered and in case of the fusion solid object having no coincidence, the new fusion solid object is registered and the previous fusion solid object is erased.

The own traveling region estimating section 18 inputs signals indicative of vehicle speeds from the vehicle speed sensor 7, signals indicative of steering wheel rotation angles from the steering wheel rotation angle sensor 8 and signals indicative of yaw rates from the yaw rate sensor 9, respectively and at the same time inputs lane marker data, side wall data and the like from the stereoscopic image processing section 15, estimating own traveling regions from the own traveling path and the width of lane.

In the own traveling region estimating section 18, the traveling path of the own vehicle is estimated according to the following four methods:

Method A: Estimation of Traveling Path Based on Lane Markers

In case where both or either of left and right lane markers data are obtained and the profile of the lane on which the own vehicle 1 travels can be estimated from these lane markers data, the traveling path of the own vehicle is formed in parallel with the lane markers in consideration of the width of the own vehicle 1 and the position of the own vehicle 1 in the present lane.

Method B: Estimation of Traveling Path Based on Side Wall Data Such as Guardrails, Curbs and the Like In case where both or either of left and right side walls data are obtained and the profile of the lane on which the own vehicle 1 travels can be estimated from these side walls data, the traveling path of the own vehicle is formed in parallel with the side walls in consideration of the width of the own vehicle 1 and the position of the own vehicle 1 in the present lane.

Method C: Estimation of Traveling Path Based on a Trace of the Preceding Vehicle The traveling path of the own vehicle 1 is estimated based on the past traveling trace of the preceding vehicle.

Method D: Estimation of Path Based on the Trace of the Own Vehicle

The path of the own vehicle 1 is estimated based on the traveling conditions such as yaw rate $\gamma$, vehicle speed V and steering wheel angle $\theta H$ of the own vehicle 1 according to the following steps:

First, it is judged whether or not the yaw rate sensor 9 is effective. If it is effective, the present turning curvature Cua is calculated according to the following formula (5).

$$Cua = \gamma/V \quad (5)$$

On the other hand, if the yaw rate sensor 9 is ineffective, it is judged whether or not the vehicle is steered at a steering angle $\delta$ more than a prescribed angle (for example 0.57 radian) obtained from the steering wheel angle $\theta H$. In case where the vehicle is steered at a steering angle more than 0.57 radian, the present turning curvature Cua is calculated according to the following formulas (2), (3) using the steering angle $\delta$ and the vehicle speed V of the own vehicle 1:

$$Re = (1 + A \cdot V^2) \cdot (L/\delta) \quad (6)$$

$$Cua = 1/Re \quad (7)$$

where Re is turning radius; A is stability factor of the vehicle; and L is wheelbase of the vehicle.

Further, if the steering angle is smaller than 0.57 radian, the present turning curvature is set to 0 (in a straightforward traveling condition).

Then, an average turning curvature is calculated from the sum of thus obtained present turning curvature Cua and a turning curvature for a past prescribed time (for example, 0.3 seconds) and the traveling path of the own vehicle is estimated.

Even in case where the yaw rate sensor 9 is effective and the turning curvature Cua is calculated according to the formula (5), if the steering angle $\delta$ is smaller than 0.57 radian, the present turning curvature Cua may be corrected to 0 (straightforward traveling condition).

Thus, after the traveling path of the own vehicle is estimated, the own traveling region 18 calculates the width of the lane on which the own vehicle 1 travels.

Specifically, in the own traveling region estimating section 18, in case where the own traveling path is estimated according to the method A and the stereoscopic image processing section 15 recognizes both of the left and right lane markers, the space of left and right lane markers is established to be the present lane width. On the other hand, in case where the own traveling path is estimated according to the method A and the stereoscopic image processing section 15 recognizes either of the left and right lane markers, an average lane width is established to be the present lane width. Further, in case where the own traveling path is estimated according to either of the methods B, C or D, the lane width 2.2 meters which are established in consideration of modern road situations and the like, is established to be the present lane width. Further, in the own traveling region estimating section 18, after the establishment of the present lane width is completed, the average lane width is calculated from the lane widths accumulated for the past 10 seconds within the range between 3.5 meters and 2.2 meters. Thus, the traveling region of the own vehicle 1 is estimated.

The preceding vehicle recognizing section 19 investigates the reliability as the millimeter wave fusion solid object and the reliability as the image fusion solid object for the respective fusion solid objects moving forward and the intrusion of these respective fusion solid objects into the own traveling region. In case where at least either of these reliabilities has a specified reliability or more and there are fusion solid objects intruding successively into the own traveling region for more than specified time, a forward moving object nearest to the own vehicle 1 is selected as a preceding vehicle from these fusion solid objects.

Figure 4:
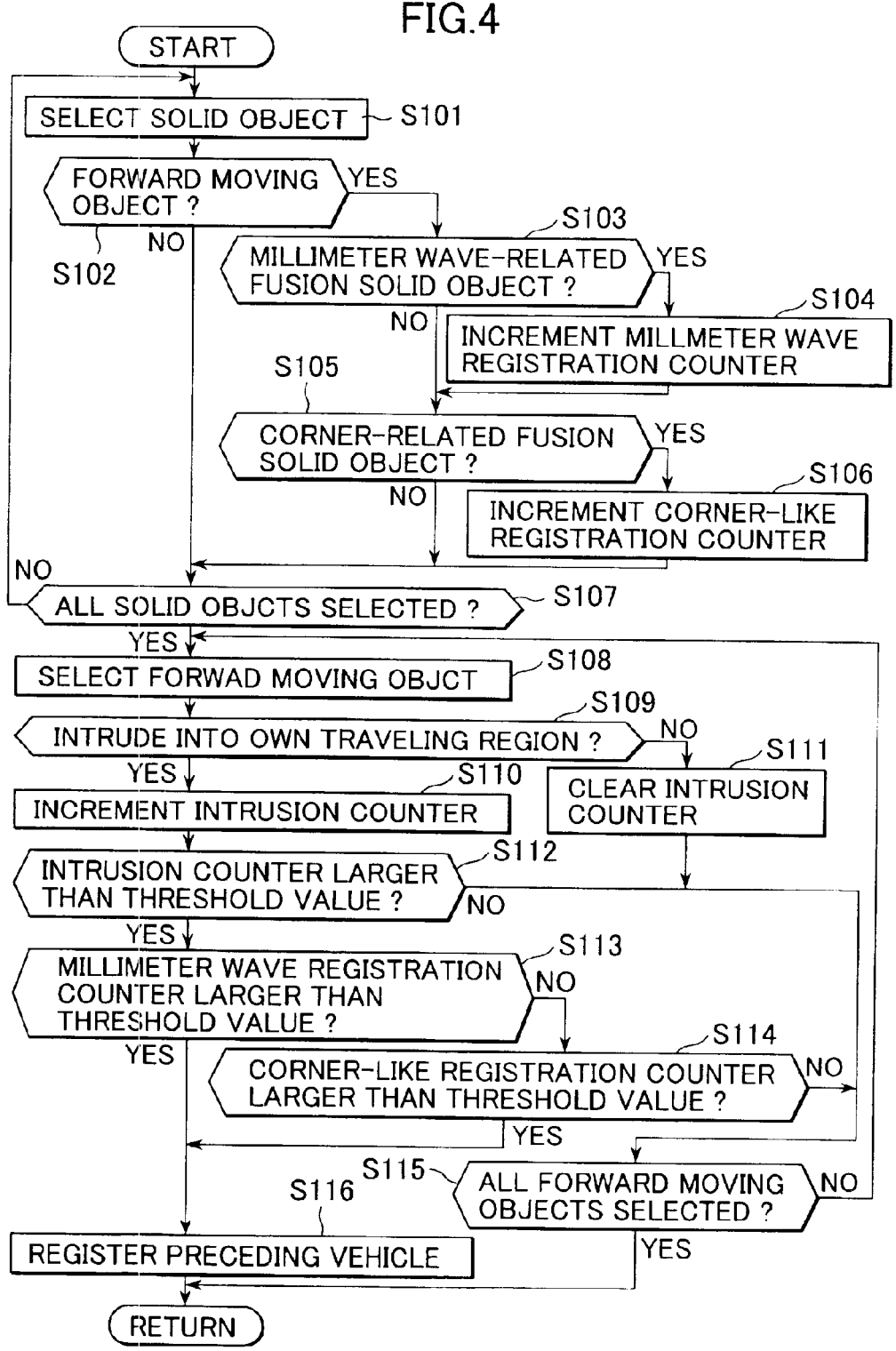
FIG. 4 is a flowchart showing a routine for recognizing a preceding vehicle.

The routine for recognizing the preceding vehicle will be described according to the flowchart shown in FIG. 4. The routine is executed every specified time. First, at a step S101, a solid object is selected from the respective fusion solid object established in the fusion solid object establishing section 17. In this embodiment, the fusion solid objects are selected in the order of their proximity from the own vehicle 1.

The program goes to a step S102 where the preceding vehicle recognizing section 19 investigates whether or not the fusion solid object presently selected is a forward moving solid object which moves in the same forward direction as the own vehicle 1. If it is judged that the fusion solid object presently selected is a forward moving object, the program goes to a step S103 and if it is judged that the fusion solid object is not a forward moving object, the program goes to a step S107.

In case where the program goes from the step S102 to the step S103, the preceding vehicle recognizing section 19 investigates whether or not the present fusion solid object is a millimeter wave-related fusion solid object, that is, either a single millimeter wave fusion solid object and/or a combination of the millimeter wave fusion solid object and the image fusion solid object. In case where the present fusion solid object is the millimeter wave-related fusion solid object, the program goes to a step S104 in which a millimeter wave registration counter Cm is incremented by one (Cm←Cm+1) and then goes to a step S105. On the other hand, in case where it is judged at the step S103 that the present fusion solid object is not a millimeter wave-related fusion solid object, the program goes to a step S105.

The program going from the step S103 or the step S104 to the step S105, the preceding vehicle recognizing section 19 investigates whether or not the present fusion solid object is a corner-related fusion solid object, that is, either a single image fusion solid object or a combination of the millimeter wave fusion solid object and the image fusion solid object and the image solid object constituting the fusion solid object is registered as a corner-like solid object. If it is judged that the present fusion solid object is a corner-related fusion solid object, the program goes to a step S106 where a corner-like registration counter is incremented by one (Cc←Cc+1) and goes to a step S107. On the other hand, if it is judged that the present fusion solid object is not a corner-related fusion solid object, the program goes to a step S107.

When the program goes from the steps S102, S105 or S106 to the step S107, the preceding vehicle recognizing section 19 checks whether or not all fusion solid objects are selected. If it is judged that all of the fusion solid objects have not yet selected, the program returns to the step S101 and if it is judged that all of the fusion solid objects have selected, the program goes to S108.

At the step S108, the preceding vehicle recognizing section 19 selects a specified forward moving object from respective fusion solid objects that are judged to be the forward moving objects at the step S102. The selection of the specified forward moving object is performed in the order of their proximity from the own vehicle 1.

Then, the program goes to a step S109 where it is checked whether or not the presently selected forward moving object intrudes into the own traveling region. If it is judged that the presently selected forward moving object intrudes into the own traveling region, the program goes to a step S110 where an intrusion counter Ci for counting the number of intrusion into the own traveling region is incremented by one (Ci←Ci+1) and then the program goes to a step S112. On the other hand, if it is judged that the presently selected forward moving object does not intrude into the own traveling region, the program goes to a step S111 where the intrusion counter Ci is cleared (Ci←0) and the program goes to a step S115.

When the program goes from the 110 to the step S112, the preceding vehicle recognizing section 19 investigates whether or not the intrusion counter Ci for the forward moving object Is larger than a preestablished threshold value Ci1. That is, it is investigated whether or not the present forward moving object intrudes into the own traveling region successively for more than a specified time. If it is judged at the step S112 that the intrusion counter Ci is larger than the threshold value Ci1, the program goes to a step S113 and if it is judged that the intrusion counter Ci is smaller than the threshold value Ci1, the program goes to a step S115.

When the program goes from the step S112 to a step S113, the preceding vehicle recognizing section 19 investigates whether or not the present forward moving object has a higher degree of the reliability with respect to the actual existence than a preestablished degree of reliability by checking whether or not the millimeter wave registration counter Cm is larger than a preestablished threshold value Cm1. That is, the preceding vehicle recognizing section 19 investigates whether or not the forward moving object has a higher degree of the reliability with respect to the actual existence than a preestablished degree of reliability by investigating whether or not the present forward moving object coincides with the millimeter wave fusion solid object with higher frequency than specified. Then, in case where the millimeter wave counter Cm is larger than the threshold value Cm1, the program goes to a step S116 and in case where the millimeter wave counter Cm is smaller than the threshold value Cm1, the program goes to a step S115.

When the program goes from a step S113 to a step S114, the preceding vehicle recognizing section 19 investigates whether or not the forward moving object has a higher degree of the reliability with respect to the actual existence than a preestablished degree of reliability by investigating whether or not the corner-like registration counter Cc for the present forward moving object is larger than a preestablished threshold value Cc1. That is, the preceding vehicle recognizing section 19 investigates whether or not the forward moving object has a higher degree of the reliability with respect to the actual existence than a preestablished degree of reliability based on the image solid object by investigating whether or not the present forward moving object coincides with the corner-like solid object with a larger frequency than specified. Further, at the step S114, in case where the corner-like registration counter Cc is larger than the threshold value Cc1, the program goes to a step S116 and in case where the corner-like registration counter Cc is smaller than the threshold value Cc1, the program goes to the step S115.

Then, when the program goes from the steps S113 or S114 to the step S116, the preceding vehicle recognizing section 19 registers the present forward moving object as a preceding vehicle, the program leaving the routine.

On the other hand, in case where the program goes from the steps S111, S112 or S113 to the step S115, the preceding vehicle recognizing section 19 investigates whether or not all forward moving objects have been selected. If it is judged that all of the forward moving objects have not yet been selected, the program returns to the step S108 and if it is judged that all of the forward moving objects have been selected, the program leaves the routine without performing the registration of the preceding vehicle.

The traveling control unit 6 has a function of the constant speed traveling control for maintaining the vehicle speed at a speed established by the manual input of a vehicle driver and also has a function of the follow-up traveling control for maintaining the intervehicle distance between the own vehicle and the preceding vehicle at a constant distance. Further, the control unit 6 is connected with a constant speed traveling switch 10, the vehicle surroundings monitoring apparatus 5 and the vehicle speed sensor 7. Further, the constant speed traveling switch 10 includes a plurality of switches connected to an operating lever provided at the side face of a steering column tube.

The constant speed traveling switch 10 is constituted by a coast switch for changing the target vehicle speed in a descending direction, a resume switch for changing the target vehicle speed in an ascending direction and the like. Further, there is provided a main switch (not shown) for turning the traveling control on or off in the vicinity of the operating lever.

When the driver turns the main switch on and establishes the operating lever to a desired speed, a signal is inputted from the constant speed traveling switch 10 to the traveling control unit 6. The traveling control unit 6 drives a throttle actuator 11 based on the signal so as to control the opening angle of a throttle valve 12. As a result, the own vehicle travels automatically at a constant speed.

Further, when the vehicle surroundings monitoring apparatus 5 judges that the preceding vehicle travels at a lower speed than that established in the traveling control unit 6 of the own vehicle 1, the traveling control unit 6 automatically changes over the control mode from the constant speed traveling control to the follow-up traveling control in which the own vehicle 1 travels with a constant intervehicle distance held.

When the traveling control transfers to the follow-up control, the traveling control unit 6 establishes an appropriate target intervehicle distance between the own vehicle 1 and the preceding vehicle on the basis of the intervehicle distance obtained by the vehicle surroundings monitoring apparatus 5, a calculated vehicle speed of the preceding vehicle, and a vehicle speed detected by the vehicle speed sensor 7. The traveling control unit 6 outputs a drive signal to the throttle actuator 11 and adjusts the opening angle of the throttle valve 12 such that the intervehicle distance between the own vehicle 1 and the preceding vehicle agrees with the target intervehicle distance.

According to the embodiment of the present invention, the vehicle surroundings monitoring apparatus 5 establishes fusion solid objects composed of single image fusion solid objects, single millimeter wave fusion solid objects, or combinations of the image fusion solid object and the millimeter wave fusion solid object. Further, the vehicle surroundings monitoring apparatus 5 investigates the reliability of respective fusion solid objects coinciding with the image solid object and the reliability of respective fusion solid objects coinciding with the millimeter wave solid object. Then, if either of these reliabilities exceeds a reliability respectively established, the fusion solid object is selected as a preceding vehicle. Thus, since both image means and radar means are used concurrently, more accurate surroundings monitoring can be performed.

Further, since the reliability of the respective fusion solid objects is performed based on the number of registrations as a corner-like solid object or based on the number of detection as a millimeter wave solid object, the preceding vehicle can be selected with high accuracy.

The entire contents of Japanese Patent Application No. Tokugan 2002-278129 filed Sep. 24, 2002, is incorporated herein by reference.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A vehicle surroundings monitoring apparatus for monitoring surroundings of an own vehicle, comprising:
   imaging means for taking picture images and for outputting image information;
   radar means;
   first solid object detecting means for detecting first solid objects based on said image information;
   second solid object detecting means for detecting second solid objects based on signals from said radar means;
   fusion solid object establishing means for establishing fusion solid objects composed of single first solid objects, single second solid objects and a combination of said first solid objects and said second solid objects by fusing said first solid objects and said second solid objects;
   first reliability judging means for judging a degree of reliability of said fusion solid objects based on a detecting situation of said respective fusion solid objects by said first solid object detecting means;
   second reliability judging means for judging a degree of reliability of said fusion solid objects based on a detecting situation of said respective fusion solid objects by said second solid object detecting means; and
   preceding vehicle selecting means for selecting a preceding vehicle from said fusion solid objects when it is judged that said fusion solid objects have a specified level of reliability according to either of said first reliability judging means and said second reliability judging means.

2. The vehicle surroundings monitoring apparatus according to claim 1,
   wherein said first solid object detecting means register a solid object having at least two surfaces connected with each other through a corner as a corner-like solid object and said first reliability judging means judge said reliability of said respective fusion solid objects based on the number of times of coincidence of the fusion solid objects with either of said single first solid objects and a combination of said first solid objects and said second solid objects and at the same time based on the number of times of registration of said respective fusion solid objects as said corner-like solid object by said first solid object detecting means.

3. The vehicle surroundings monitoring apparatus according to claim 1, wherein said second reliability judging means judge said reliability of said respective fusion solid objects based on the number of times of coincidence of said fusion solid objects with either of said single second solid objects and a combination of said first solid objects and said second solid objects.

4. A traveling control system for controlling a traveling of an own vehicle based on information of a preceding vehicle selected by said vehicle surroundings monitoring apparatus described in claim 1.

5. A traveling control system for controlling a traveling of an own vehicle based on information of a preceding vehicle selected by said vehicle surroundings monitoring apparatus described in claim 2.

6. A traveling control system for controlling a traveling of an own vehicle based on information of a preceding vehicle selected by said vehicle surroundings monitoring apparatus described in claim 3.

7. A vehicle surroundings monitoring apparatus for monitoring surroundings of an own vehicle, comprising:
 imaging means for taking picture images and for outputting image information; radar means;
 first solid object detecting means for detecting first solid objects based on said image information;
 second solid object detecting means for detecting second solid objects based on signals from radar means;
 fusion solid object establishing means for establishing fusion solid objects composed of single first solid objects, single second objects or a combination of said first solid objects and said second solid objects by fusing said first solid objects and said second solid objects;
 first reliability judging a degree of reliability of said fusion solid objects based on a detecting situation of said fusion solid objects by said first solid objects detecting means;
 second reliability judging means for judging a degree of reliability of said fusion solid objects based on a detecting situation of said fusion solid objects by said second solid object detecting means; and
 preceding vehicle selecting means for selecting a preceding vehicle from said fusion solid objects when it is judged that said fusion solid objects have a specified level of reliability according to either of said first reliability judging means and said second reliability judging means.

8. The vehicle surroundings monitoring apparatus according to claim 7,
 wherein said first solid object detecting means register a solid object having at least two surface connected with each other through a corner as a corner-like solid object and said first reliability judging means judge said reliability of said fusion solid objects based on the number of times of concidence of the fusion solid objects with said single first solid objects or a combination of said first solid objects and said second solid objects or the number of times of registration of said respective fusion solid objects as said corner-like solid object by said first solid object detecting means.

9. The vehicle surroundings monitoring apparatus according to claim 7,
 wherein said second reliability judging means judge said reliability of said fusion solid objects based on the number of times of concidence of said fusion solid objects with either of said single second solid objects or a combination of said first solid objects and said second solid objects.

10. A vehicle surroundings monitoring apparatus for monitoring surroundings of an own vehicle, comprising:
 imaging means for taking picture images and for outputting image information;
 radar means;
 first solid object detecting means for detecting first solid objects based on said image information, wherein said first solid object detecting means registers a solid object having at least two surface connected which each other through a corner as a corner-like solid objects;
 second solid object detecting means for detecting second solid objects based on signals from said radar means;
 fusion solid object establishing means for establishing fusion solid objects composed of single first solid objects, single second solid objects or a combination of said first solid objects and said second solid by fusing said first solid objects and said second solid objects;
 reliability judging means for judging a degree of reliability of said fusion solid objects based on a number of times of concidence of the fusion solid objects with said single first solid objects or a combination of said first solid objects and said second solid objects or a number of times of registration of said fusion solid objects as said corner-like solid object by said first solid object detecting means; and
 proceeding vehicle selecting means for selecting a preceding vehicle from said fusion solid objects when it is judged that said fusion solid objects have a specified level of reliability according to said reliability judging means.

11. A vehicle surroundings monitoring apparatus for monitoring surroundings of an own vehicle, comprising:
 imaging means for taking picture images and for outputting image information;
 radar means;
 first solid object detecting means for detecting first solid objects based on said image information;
 second solid object detecting means for detecting second solid objects based on signals from said radar means;
 fusion solid object establishing means for establishing fusion solid objects composed of single first solid objects, single second solid objects or a combination of said first solid objects and said second objects by fusing said first solid objects and said second solid objects;
 reliability judging means for judging a degree of reliability of said fusion solid objects based on a number of times of concidence of said fusion solid objects with said single second solid objects or a combination of said first solid objects and said second solid objects; and
 preceding vehicle selecting means for selecting a preceding vehicle from said fusion solid objects when it is judged that said fusion solid objects have a specified level of reliability according to said reliability judging means.

* * * * *